(12) United States Patent
Uno et al.

(10) Patent No.: US 7,719,139 B2
(45) Date of Patent: May 18, 2010

(54) POWER SUPPLY UNIT

(75) Inventors: Yoshiyuki Uno, Nagaokakyo (JP); Akio Nishida, Kyoto (JP); Hiroshi Takemura, Muko (JP)

(73) Assignee: Murata Macufacturing Co., Ltd., Kyoto (JP)

( * ) Notice: Subject to any disclaimer, the term of this patent is extended or adjusted under 35 U.S.C. 154(b) by 324 days.

(21) Appl. No.: 10/595,276

(22) PCT Filed: Feb. 17, 2005

(86) PCT No.: PCT/JP2005/008926

§ 371 (c)(1),
(2), (4) Date: Apr. 4, 2006

(87) PCT Pub. No.: WO2006/087827

PCT Pub. Date: Aug. 24, 2006

(65) Prior Publication Data

US 2009/0200870 A1 Aug. 13, 2009

(30) Foreign Application Priority Data

Feb. 15, 2005 (JP) .............................. 2005-038230

(51) Int. Cl.
*H02J 1/00* (2006.01)
*G05F 5/00* (2006.01)
(52) U.S. Cl. ....................................... 307/80; 323/299
(58) Field of Classification Search .................. 307/80; 323/299, 318
See application file for complete search history.

(56) References Cited

FOREIGN PATENT DOCUMENTS

| JP | 04-008167 | 1/1992 |
|----|-----------|--------|
| JP | 06-121523 | 4/1994 |
| JP | 08-191569 | 7/1996 |
| JP | 2003-18842 | 1/2003 |

OTHER PUBLICATIONS

Official communication issued in couterpart Chinese Application No. 20050001069.5, mailed on Dec. 12, 2008.
International Search Report for PCT Application No. PCT/JP2005/008926, mailed Sep. 6, 2005.
Official communication issued in the counterpart Korean Application No. 10-2006-7006508, mailed on Apr. 24, 2007.

*Primary Examiner*—Albert W Paladini
*Assistant Examiner*—Michael Rutland Wallis
(74) *Attorney, Agent, or Firm*—Keating & Bennett, LLP

(57) ABSTRACT

A power supply unit includes a main power-supply circuit and a secondary power-supply circuit which are connected to an alternating current power supply AC. The main power-supply circuit includes a full-wave rectifier and an input current control circuit corresponding to a harmonic current suppression circuit. The input current control circuit includes a resistor as circuit current detection element and a control circuit for controlling a switch element by detecting a current flowing in the resistor. A connection is provided such that a current flowing in a diode as a second rectifying circuit of the secondary power-supply circuit may return to the alternating current power supply through the resistor.

12 Claims, 8 Drawing Sheets

POWER SUPPLY UNIT

BACKGROUND OF THE INVENTION

1. Field of the Invention

The present invention relates to a power-supply unit, and more particularly, to a power-supply unit which suppresses harmonic current and improves power-factor.

2. Description of the Related Art

In equipment receiving the supply of electric power from a commercial alternating current power supply, the power supply is required to suppress the generation of harmonic currents. Since a circuit having a harmonic current suppression function also includes a power-factor improvement function, the circuit is often called a power-factor improvement circuit as in a power-supply unit shown in Japanese Unexamined Patent Application Publication No. 2003-18842 (Patent Document 1).

In the equipment having a standby mode as in televisions, for example, it is also necessary to operate a waiting circuit (for example, a reception circuit for receiving only a power-supply upon receipt of a signal from a remote control system) during standby. However, it is very inefficient to operate the entire power-supply unit for a waiting circuit which consumes only a very small amount of electric power. In particular, since a reduction in electric power loss during standby has recently been required, it is necessary to develop countermeasures.

In a switching power-supply circuit as described in Patent Document 1, a main power-supply circuit which is not operated during standby and a secondary power-supply circuit which is operated to constantly supply a small amount of electric power, including during standby also, are provided, and both the main power-supply circuit and the secondary power-supply circuit are connected to an alternating current power supply.

In the switching power-supply circuit described in Patent Document 1, since large harmonic current is generated in the main power-supply circuit having a large electric power supply capacity, even if the circuit structure becomes complicated, a harmonic current suppression circuit is provided therein, and, on the contrary, since small harmonic current is generated in the secondary power-supply circuit having a small electric power supply capacity, no harmonic current suppression circuit is provided therein.

In equipment, such as televisions, there are cases in which a power supply having various output voltages is required, and there is the demand for a secondary power-supply circuit which can be used not only on standby, but also for other purposes during normal operation. Practically, necessary voltages on standby are often the voltages of +5 V and +3.3 V required for operation of simple digital circuits, for example, the voltages of +5 V and +3.3 V can also be used for various other purposes. Therefore, a power-supply unit is designed so as to be fitted not for the amount of power consumption on standby, but for the amount of power consumption during normal operation. In this case, the secondary power-supply circuit is designed so as to have a substantial amount power supply capacity in reserve.

However, in Patent Document 1, for example, the secondary power-supply circuit includes no harmonic current suppression circuit. Accordingly, when the amount of power supply in the secondary power-supply circuit increases, the amount of harmonic current generated also increases, and this increased harmonic current is not accounted for.

SUMMARY OF THE INVENTION

To overcome the above-described problems, preferred embodiments of the present invention provide a power-supply unit in which a main power-supply circuit having a harmonic current suppression circuit and a secondary power-supply circuit having no harmonic current suppression circuit are provided and, while electric power is supplied from the secondary power-supply circuit, harmonic current is suppressed and simultaneously the power factor is improved.

A power-supply unit according to a preferred embodiment of the present invention includes a main power-supply circuit and a secondary power-supply circuit, both connected to an alternating current power supply, and an input current control circuit provided in the main power-supply circuit. In the power-supply unit, the input current control circuit controls an input current to the main power-supply circuit such that harmonic current is suppressed in a current of the summation of the input current to the main power-supply circuit and an input current to the secondary power-supply circuit.

A power-supply unit according to another preferred embodiment of the present invention includes a main power-supply circuit and a secondary power-supply circuit, both connected to an alternating current power supply, and an input current control circuit provided in the main power-supply circuit. In the power-supply unit, the input current control circuit controls an input current to the main power-supply circuit such that a current of the summation of the input current to the main power-supply circuit and an input current to the secondary power-supply circuit is substantially proportional to an input voltage to the input current control circuit.

A power-supply unit according to another preferred embodiment of the present invention includes a main power-supply circuit and a secondary power-supply circuit, both connected to an alternating current power supply, an input current control circuit provided in the main power-supply circuit, and a circuit current detection element provided in the input current control circuit. In the power-supply unit, a current of the summation of an input current to the main power-supply circuit and an input current to the secondary power-supply circuit flows in the circuit current detection element, and the input current control circuit controls the input current to the main power-supply circuit such that harmonic current is suppressed in the current flowing in the circuit current detection element.

Furthermore, a power-supply unit according to another preferred embodiment of the present invention includes a main power-supply circuit and a secondary power-supply circuit, both connected to an alternating current power supply, an input current control circuit provided in the main power-supply circuit, and a circuit current detection element provided in the input current control circuit. In the power-supply unit, a current of the summation of an input current to the main power-supply circuit and an input current to the secondary power-supply circuit flows in the circuit current detection element, and the input current control circuit controls the input current to the main power-supply circuit such that the current flowing in the circuit current detection element is substantially proportional to an input voltage to the input current control circuit.

A power-supply unit according to at least one preferred embodiment of the present invention preferably further includes a first rectifying circuit connected between the alternating current power supply and the input current control circuit, the first rectifying circuit provided in the main power-supply circuit, a second rectifying circuit connected to the alternating current power supply, the second rectifying circuit provided in the secondary power-supply circuit, and a smoothing circuit connected to the second rectifying circuit, wherein the smoothing circuit is provided in the second power-supply circuit. Moreover, a power-supply unit according to at least one preferred embodiment of the present invention preferably further includes a switch connected between the alternating current power supply and the first rectifying circuit.

A power-supply unit according to at least one preferred embodiment of the present invention preferably further includes a first rectifying circuit connected between the alternating current power supply and the input current control circuit, the first rectifying circuit provided in the main power-supply circuit, a reverse-current prevention diode connected to the output of the first rectifying circuit, the reverse-current prevention diode provided in the secondary power-supply circuit, and a smoothing circuit connected to the output of the reverse-current prevention diode, wherein the smoothing circuit is provided in the secondary power-supply circuit.

Furthermore, in a power-supply unit according to a preferred embodiment of the present invention, the input current control circuit is a boost converter. Moreover, the boost converter includes an inductance element having one terminal connected to one output terminal of the first rectifying circuit, a diode connected between the other terminal of the inductance element and an output terminal of the main power-supply circuit, a switch element connected between the other terminal of the inductance element and the other output terminal of the first rectifying circuit, and a smoothing capacitor connected between an output terminal of the main power-supply circuit and the other output terminal of the first rectifying circuit.

In a power-supply unit according to a preferred embodiment of the present invention, the input current control circuit is a flyback converter. Moreover, the flyback converter includes a transformer in which one terminal of a primary winding is connected to one output terminal of the first rectifying circuit, a switch element connected between the other terminal of the primary winding and the other terminal of the first rectifying circuit, a diode connected between one terminal of a secondary winding of the transformer and an output terminal of the main power-supply circuit, and a smoothing capacitor connected between an output terminal of the main power-supply circuit and the other terminal of the secondary winding.

In a power-supply unit according to preferred embodiments of the present invention, in addition to a main power-supply circuit having a circuit generally called a harmonic current suppression circuit or power-factor improvement circuit, a secondary power-supply circuit having no harmonic current suppression circuit or improvement circuit is provided. Moreover, although a load current is taken out from the secondary power-supply unit, an input current to the main power-supply circuit is controlled such that a current of the summation of the input current to the main power-supply circuit and an input current to the secondary power-supply circuit is substantially proportional to an input voltage to an input current control circuit. Thus, in the power-supply unit, an input current is substantially a sine wave, and, as a result, the generation of harmonic current is suppressed and simultaneously the power factor is improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred Embodiment 1

Figure 1:
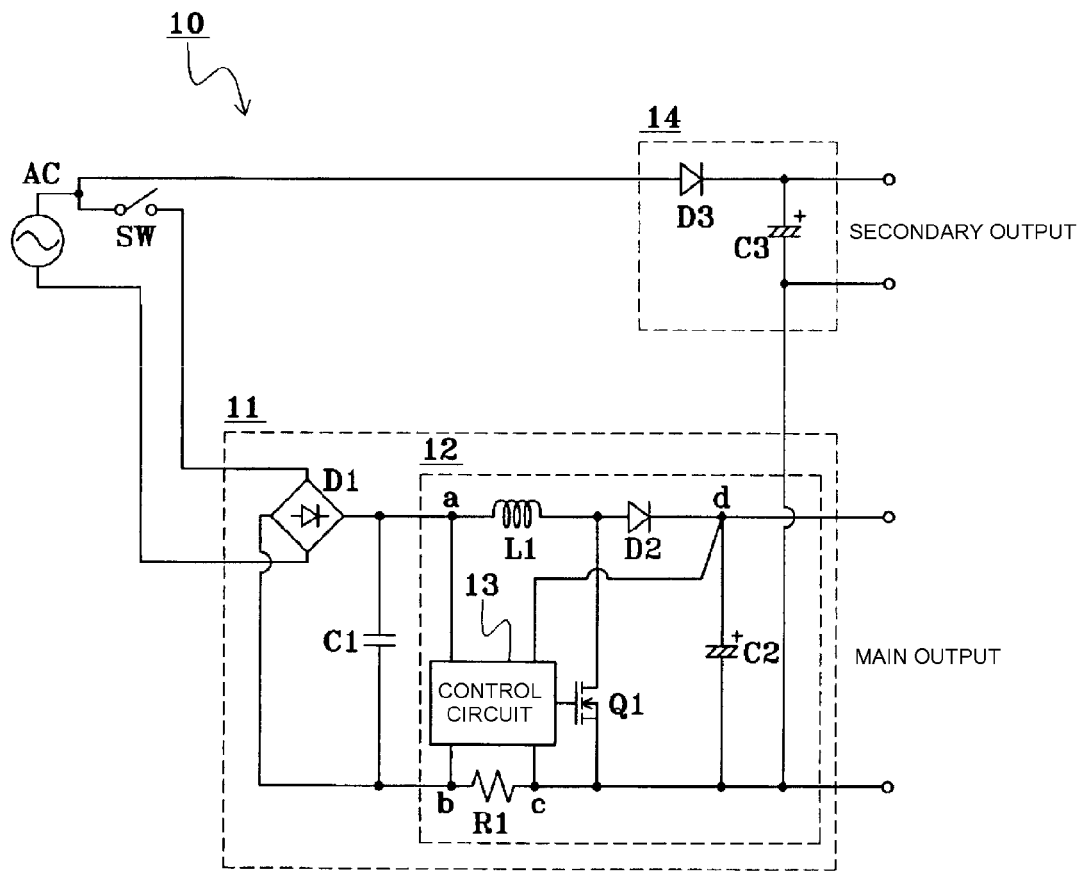
FIG. 1 is a circuit diagram of a preferred embodiment of a power-supply unit of the present invention.

FIG. 1 is a circuit diagram of a preferred embodiment of a power-supply unit of the present invention. In FIG. 1, a power-supply unit 10 includes a main power-supply circuit 11 and a secondary power-supply circuit 14. The main power-supply unit 11 is connected to an alternating current power supply AC through a switch SW. The secondary power-supply circuit 14 is directly connected to the alternating current power supply AC, but not through the switch SW.

Moreover, when required, another power-supply circuit, such as a DC-DC converter, is connected on the output side of each of the main power-supply circuit 11 and the secondary power-supply circuit 11 so as to obtain a desired output voltage, although the description is omitted since it is not the point of the present invention. Moreover, each power-supply circuit may be referred to as a main power-supply circuit and a secondary power-supply circuit.

The switch SW is for turning on and off the main power-supply circuit 11. During standby, a current is supplied only to the secondary power-supply circuit such that the main power-supply circuit 11 is turned off, so as to reduce the power loss on standby. Moreover, although it is desirable to include the switch SW in the present preferred embodiment, the switch SW is not essential and the main power-supply circuit 11 may be directly connected to the alternating current power supply AC.

First, assuming that the secondary power-supply circuit 14 is not provided, the structure and operation of the main power-supply circuit 11 is described. The main power-supply circuit 11 includes a full-wave rectifier D1 as a first rectifying circuit, a noise rejection capacitor C1, and an input current control circuit 12. One input terminal of the full-wave rectifier D1 is connected to one terminal of the alternating current power supply AC through the switch SW and another input terminal is connected to the other terminal of the alternating current power supply AC. The two output terminals of the full-wave rectifier D1 are connected to the input current control circuit 12. The output of the input current control circuit 12 defines the output of the main power-supply circuit 11. The noise rejection capacitor C1 is connected between the two output terminals of the full-wave rectifier D1. The capacitance of the capacitor C1 is sufficiently small in comparison with what is used as a smoothing capacitor in the 60-Hz alternating current power supply and practically does not have a function to smooth variations due to the frequency change of an alternating current power supply.

The input current control circuit 12 is what is generally called a harmonic current control circuit or power-factor improvement circuit and includes an inductance element L1, a diode D2, a switch element Q1, a resistor R1, a smoothing capacitor C2, and a control circuit 13. The input current control circuit 12 is basically a boost converter (step-up chopper circuit). One terminal of the inductance element L1 is connected to one input terminal of the full-wave rectifier D1 and the other terminal is connected to the anode of the diode D2. The cathode of the diode D2 is connected to one output terminal of the main power-supply circuit 11. The other terminal of the inductance element L1, that is, the connection point to the diode D2 is connected to one terminal of the switch Q1. The other terminal of the switch Q1 is connected to another output terminal of the main power-supply circuit 11 and simultaneously connected to the other output terminal of the full-wave rectifier D1 through the resistor R1. Then, the smoothing capacitor C2 is connected between the cathode of the diode D2 and the other terminal of the switch Q1.

In the input current control circuit 12, the switch Q1 is controlled by the control circuit 13 to be turned on and off. The control circuit 13 is connected to one terminal (point a) of the inductance element L1 to detect the input voltage. Furthermore, the control circuit 13 is connected to both terminals (point b and point c from the side of the full-wave rectifier D1) of the resistor R1, and the electric potential at both terminals of the resistor R1 is detected and the amount of current flowing through the resistor R1 is detected on the basis of the difference between them.

Moreover, the control circuit 13 is also connected to the cathode (point d) of the diode D2 to detect the output voltage of the input current control circuit 12. Such a control circuit 13 is a general control circuit and often seen as IC products for harmonic current control or power-factor improvement like UC1854 of Texas Instruments, Incorporated and ML4821 of Fairchild Corporation, for example.

Figure 2:
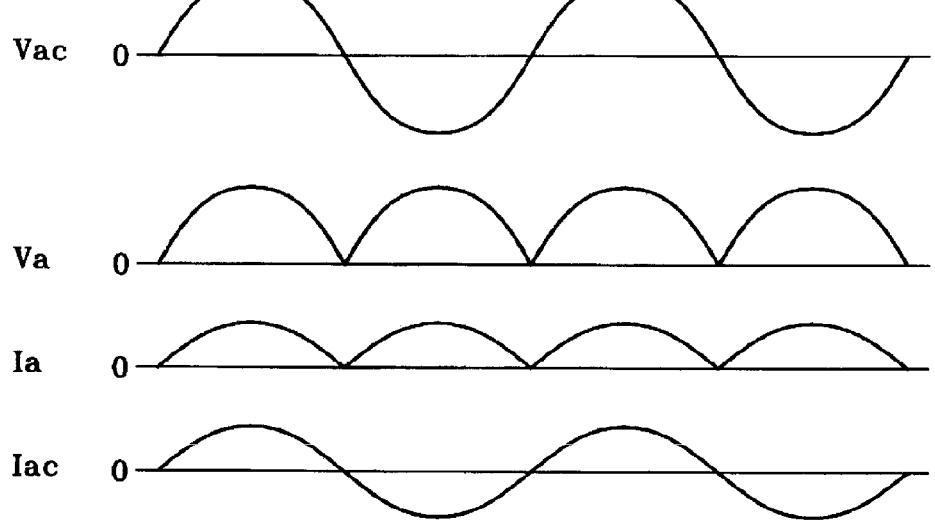
FIG. 2 is a characteristic diagram showing a schematic waveform image of a voltage or current of each portion of the power-supply unit in FIG. 1, in which it is assumed that only a main power-supply circuit is contained in the power-supply unit.

The operation of the power-supply unit 10 where it is assumed that only the main power-supply circuit is provided is described with reference to FIG. 2. FIG. 2 shows a schematic waveform image of a voltage or current of each portion of the power-supply unit 10 which are greatly simplified in comparison with their actual waveforms.

In the main power-supply circuit 11, when the voltage of the alternating current power supply is a sine wave as shown by Vac in FIG. 2, since no smoothing capacitor is connected in the output of the full-wave rectifier D1, a voltage which is full-wave rectified by the full-wave rectifier D1 and shown by Va in FIG. 2 is applied to the input current control circuit 12 substantially as it is. In the input current control circuit 12, switching of the switch element Q1 is performed at a much higher frequency than the frequency of the alternating current power supply by the control circuit 13. When it is assumed that the frequency of the alternating current is 50 Hz or 60 Hz, the switching frequency of the switch element Q1 is about 60 kHz, for example. In this way, a current corresponding to the voltage of one terminal of the inductance element L1 flows into the inductance element L1 at each time a switching operation is performed, and a step-up voltage is output to the cathode of the diode D2 and smoothed. In this case, the input current to the input current control circuit 12 macroscopically becomes a current corresponding to the absolute value of a sine wave which is substantially proportional to the input voltage Va as shown by Ia in FIG. 2. Therefore, the current flowing into the full-wave rectifier D1, that is, the input current of the main power-supply circuit 11 becomes a sine wave current which is substantially proportional to the input voltage as shown by Iac in FIG. 2. As a result, the generation of harmonic current is suppressed and at the same time the power factor is improved.

Moreover, microscopically there are small up-and-down variations in the current value corresponding to the switching cycle of the switch element Q1. The up-and-down variations in the current value are more or less smoothed by the noise rejection capacitor C1, but not completely removed.

Here, the operation of the control circuit 13 is described in more detail. An oscillation circuit of about 60 kHz is provided in the control circuit 13 and the switch element Q1 is turned on in synchronization with a signal output from the oscillation circuit.

First, it is assumed that the switch element Q1 is in the on state. At this time, a current flows through the inductance element L1 and the switch element Q1 and increases as time passes. The control circuit 13 detects the input voltage of the input current control circuit 12 and a current flowing in the resistor R1. The current flowing in the resistor R1 is equal to the current flowing in the inductance element L1, and, since the current flowing in the inductance element L1 is the input current to the main power-supply circuit 11, the control circuit 13 detects the input current to the main power-supply circuit 11. Accordingly, the resistor R1 acts as a circuit current detection element of the present invention.

Since the current flowing in the resistor R1 is equal to the current flowing in the inductance element L1, while the switch element Q1 is turned on, the current flowing in the resistor R1 increases in accordance with the current flowing in the inductance element L1. When the current flowing in the resistor R1 reaches a value substantially proportional to the input voltage (hereinafter, the current is referred to as a set value), the control circuit 13 turns off the switch element Q1.

Since the set value of current is proportional to the input voltage, the set value of current becomes low when the input voltage is low, for example, and the set value of current also becomes high when the input voltage is high, depending on the phase of the voltage of the alternating current power supply. Furthermore, the set value increases and decreases depending on the output current of the main power-supply circuit 11. That is, when the output current is small (when the main power-supply circuit has a light load), the set value becomes low, and, on the contrary, when the average value of the output current is large (the main power-supply circuit has a heavy load), the set value becomes high in accordance therewith. The control is performed such that the control circuit 13 detects the output voltage of the input current control circuit 12 and the set value of current is increased and decreased so as to maintain the output voltage at a constant value.

When the switch element Q1 is turned off, the current flowing in the inductance element L1 decreases and, in accordance therewith, the current flowing in the resistor R11 also decreases. Although the current flowing in the inductance element L1 finally becomes zero when the current continues to flow, since the switch element Q1 turns on at a fixed cycle, the switch element Q1 is turned on by the control circuit 13 before the current actually becomes zero. When the switch element Q1 is turned on, the current starts to flow in the inductance element L1 and the resistor R1 once again, and the above-described operation is repeated.

Moreover, in the above description, although a continuous current type in which the current flowing in the inductance element L1 does not become zero is assumed, a critical current type in which the current flowing in the inductance element L1 becomes zero and, by triggering that, the switch element is turned on and the current starts to flow once again and a discontinuous current type in which, after the current has become zero, a period where the current is zero continues for a period of time and then, the switch is turned on and the current starts to flow once again may be considered and then, there is no difference in the practical operation concerning harmonic current control and power-factor improvement. Furthermore, these modes may be switched in accordance with the state of the load in the main power-supply circuit 11.

In this way, when switching of the switching element Q1 is performed by the control circuit 13, the input current to the input current control circuit 12 is substantially proportional to the input voltage. Since the input current to the input current control circuit 12 is a current from the alternating current power supply which is input to the full-wave rectifier D1, the generation of harmonic current is suppressed. Furthermore, the power factor is improved.

Next, the power-supply unit 10 in which the secondary power-supply circuit 14 is provided is described. The secondary power-supply circuit 14 includes a diode D3 as a second rectifying circuit of a half-wave rectification type and a capacitor C3 as a smoothing circuit. The anode of the diode D3 is connected to one terminal of the alternating current power supply AC and the cathode is connected to one output terminal of the secondary power-supply circuit 14. One terminal of the smoothing capacitor C3 is connected to the cathode of the diode D3 and the other terminal is connected to another output terminal of the secondary power-supply circuit 14. Although the other terminal of the capacitor C3 is also connected to the other terminal of the alternating current power supply AC according to a related art, the other terminal of the capacitor C3 is connected to the other terminal of the switch element Q1 of the main power-supply circuit 11 in this preferred embodiment of the present invention. That is, the other terminal of the capacitor C3 is connected to the other terminal of the alternating current power supply AC through the resistor R1 and the full-wave rectifier D1 of the main power-supply circuit 11.

Moreover, in the secondary power-supply circuit 14, when the above-described connection is performed, not only the diode D3 as a second rectifying circuit, but also a portion of the full-wave rectifier D1 of the main power-supply circuit 11 function as a rectifying circuit of the secondary power-supply circuit 14.

Figure 3:
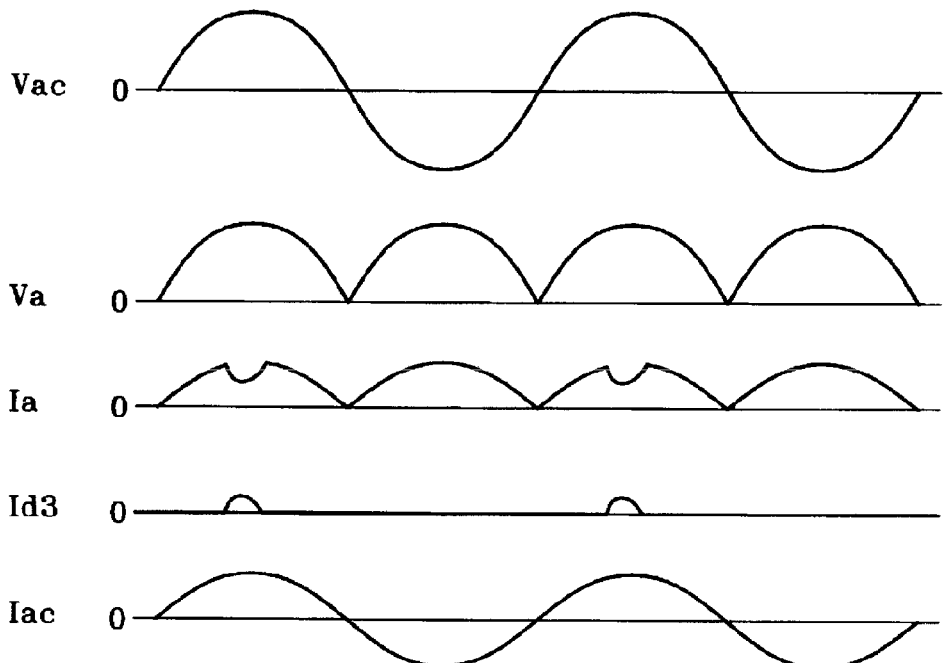
FIG. 3 is a characteristic diagram showing a schematic waveform image of a voltage or current of each portion of the power-supply unit in FIG. 1.

The operation of the power-supply unit 10 including the secondary power-supply circuit 14 is described with reference to FIG. 3. Similar to FIG. 2, FIG. 3 shows a schematic waveform image of a voltage or current of each portion of the power-supply unit 10, and these waveform images are greatly simplified as compared to their actual waveforms. Furthermore, since the voltage waveforms shown by Vac and Va in FIG. 3 are the same as in FIG. 2, their description is omitted.

The secondary power-supply circuit 14 includes the second rectifying circuit of a half-wave rectification type and the smoothing circuit, and does not include a circuit corresponding to a harmonic current suppressor circuit. Therefore, the current flowing into the secondary power-supply circuit 14 from the alternating current power supply AC is a half cycle in one cycle of an alternating current frequency and is also limited to the period in which the amplitude of the alternating current voltage is large, and subsequently, the flowing current becomes pulsed-shaped as shown by Id3 in FIG. 3. The larger the output current of the secondary power-supply circuit 14 is, the higher the height of the pulse is.

However, a current returning to the side of the alternating current power supply AC from the secondary power-supply circuit 14 flows through the resistor R1 of the input current control circuit 12. That is, a current of the summation of the input current flowing to the main power-supply circuit 11 and the input current flowing to the secondary power-supply circuit 14 from the alternating current power supply AC flows in the resistor R1. Then, in the input current control circuit 12, switching of the switch element Q1 is performed so that the current of the summation may become a value which is substantially proportional to the input voltage Va. Accordingly, the summation of the current flowing to the main power-supply circuit 11 from the alternating current power supply AC and the current Id3 flowing to the secondary power-supply circuit 14 becomes substantially proportional to the input voltage Va to the input current control circuit 12, and consequently, the generation of harmonic current is suppressed and the power factor is improved.

Specifically, first, during a period in which there is no current flowing to the secondary power-supply circuit 14 from the alternating current power supply AC, the same waveform as in the case where the secondary power-supply circuit 14 does not exist is obtained. That is, the input current control circuit 12 functions as a harmonic current suppression circuit for only the main power-supply circuit 11.

Like the waveform Ia shown in FIG. 3, as a result, the input current control circuit 12 operates so that the current flowing to the main power-supply circuit 11 from the alternating current power supply AC may decrease only during a period in which there is a current flowing to the secondary power-supply circuit 14 from the alternating power current supply AC. In this case, the input current control circuit 12 does not function as a harmonic current suppression circuit for only the main power-supply circuit 11. In this way, the current of the summation of the input current to the main power-supply circuit 11 and the input current to the secondary power-supply circuit 14 becomes a current as an absolute value of a sine wave that is substantially proportional to the input voltage Va. Accordingly, the current flowing to the power-supply unit 10 from the alternating current power supply AC becomes a sine wave current that is substantially proportional to the input voltage as shown by Iac in FIG. 3. As a result, the generation of harmonic current is suppressed and simultaneously the power factor is improved.

Moreover, like the waveform Ia shown in FIG. 3, when the input current to the main power-supply circuit 11 simply decreases, even if temporarily, the output current decreases. However, practically, the electric current value (set value) which is proportional to the input voltage defining a condition which makes the switch element Q1 turn off in the input current control circuit 12 increases as a whole, the input current to the main power-supply circuit 11 during a period where there is no input current to the secondary power-supply circuit 14 increases, the total current flowing to the main power-supply circuit 11 during one cycle of the alternating current power supply does not change, and accordingly, there is no situation in which the output current from the main power-supply circuit 11 becomes insufficient.

Preferred Embodiment 2

Figure 4:
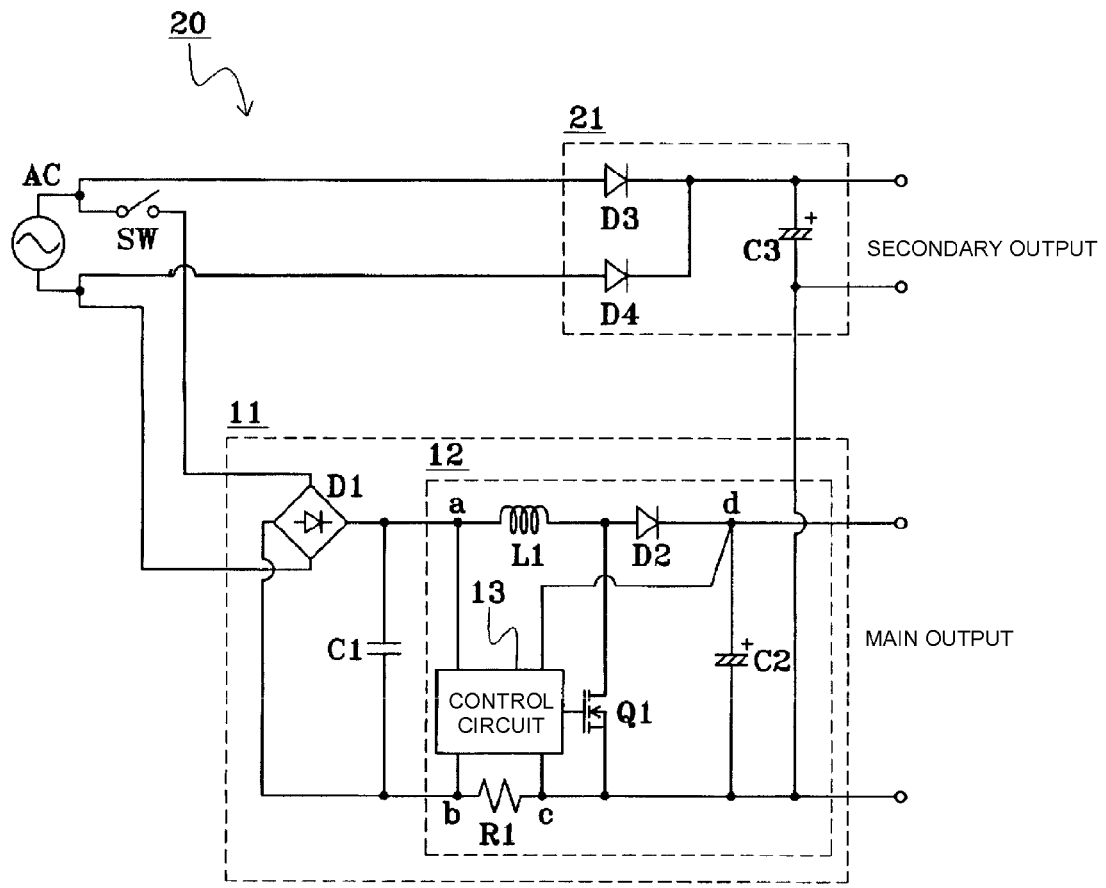
FIG. 4 is a circuit diagram of another preferred embodiment of a power-supply unit of the present invention.

FIG. 4 is a circuit diagram of another preferred embodiment of a power-supply unit of the present invention. In FIG. 4, the same reference numerals are given for the same or equivalent portions as in FIG. 1 and the descriptions thereof are omitted.

In a power-supply unit 20 shown in FIG. 4, a diode D4 is provided between the cathode of the diode D3 and the other terminal of the alternating current power supply AC such that the cathode of the diode D4 is connected to the cathode of the diode D3. A second rectifying circuit of a full-wave rectification type includes the diode D3 and the diode D4, and a secondary power-supply circuit 21 includes the second rectifying circuit and the capacitor C3. Moreover, the power-supply unit 20 is not different from the power-supply unit 10 shown in FIG. 1, except in that the second rectifying circuit provided in the secondary power-supply circuit 21 is of a full-wave rectification type.

In the power-supply unit 20, a current flows to the second power-supply circuit 21 only when the amplitude of the input voltage is large in both of the two half cycles in one cycle of the frequency of the alternating current power supply. Then, similar to the power-supply unit 10, the value of the summation of the current flowing to the main power-supply circuit 11 from the alternating current power supply AC and the current flowing to the secondary power-supply circuit 21 becomes substantially proportional to the input voltage to the input current control circuit 12. Therefore, an input current which is proportional to the voltage of the alternating current power supply AC flows to the power-supply unit 20, and, as a result, the generation of harmonic current is suppressed and the power factor is improved.

Preferred Embodiment 3

Figure 5:
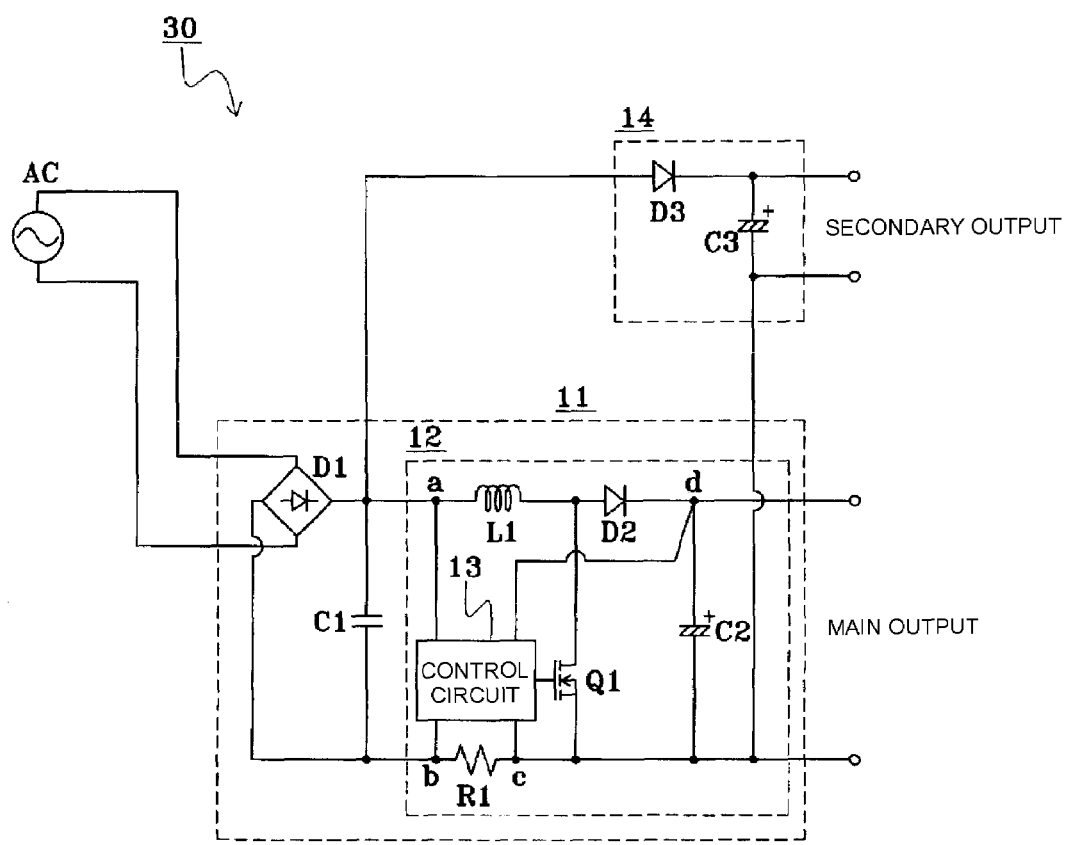
FIG. 5 is a circuit diagram of still another preferred embodiment of a power-supply unit of the present invention.

FIG. 5 is a circuit diagram of another preferred embodiment of a power-supply unit of the present invention. In FIG. 5, the same reference numerals are given for the same or equivalent portions as in FIG. 1 and the descriptions thereof are omitted.

In a power-supply unit 30 shown in FIG. 5, the main power-supply circuit 11 is directly connected to the alternating current power supply AC, not through a switch. Moreover, the anode of the diode D3 in the secondary power-supply circuit 14 is connected to one output terminal of the full-wave rectifier D1. That is, in the secondary power-supply circuit 14, an output is obtained such that a pulsating voltage after full-wave rectification in the full-wave rectifier D1 passes through the diode D3 and is then smoothed by the capacitor C3. Although the circuit structure of the secondary power-supply circuit 14 is the same as that in the power-supply unit 10 shown in FIG. 1, the diode D3 does not function as a rectifier, but rather, functions as a reverse-current prevention diode for preventing a current in the reverse direction flowing to the full-wave rectifier D1 due to the voltage charge in the capacitor C3.

In the power-supply unit 30, although a current flows to the second power-supply circuit 21 only when the amplitude of the input voltage is large in both of the two half cycles in one cycle of the frequency of the alternating current power supply, similar to the power-supply units 10 and 20, the current of the summation of the input current flowing to the main power-supply circuit 11 from the alternating current power supply AC and the input current flowing to the secondary power-supply circuit 21 becomes substantially proportional to the input voltage to the input current control circuit 12. Therefore, an input current which is substantially proportional to the voltage of the alternating current power supply AC flows to the power-supply unit 30, and, as a result, the generation of harmonic current is suppressed and the power factor is improved.

Figure 6A:
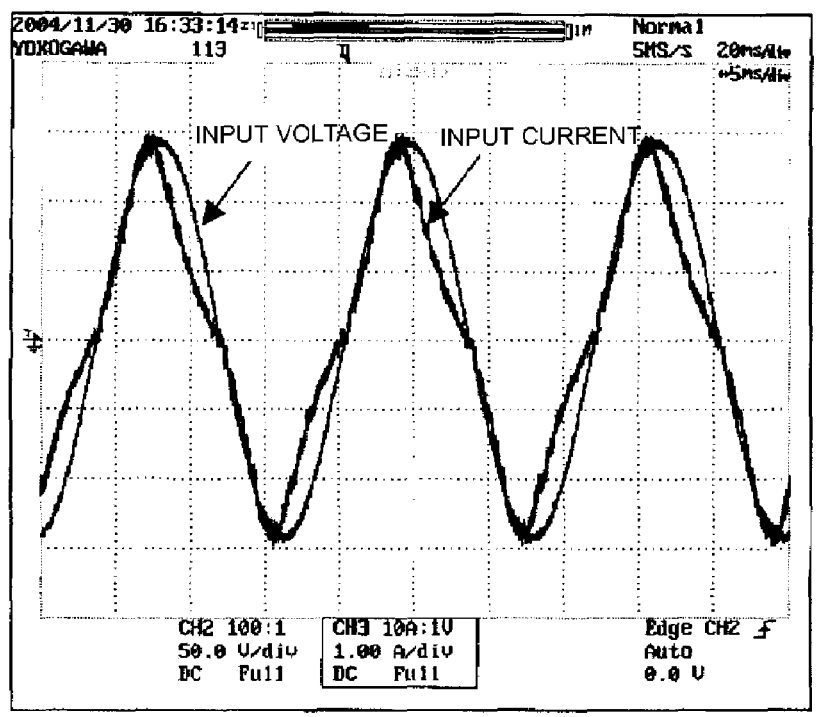
FIGS. 6A and 6B are characteristic diagrams showing the relationship between an input voltage and an input current in the power-supply unit in FIG. 5.
Figure 6B:
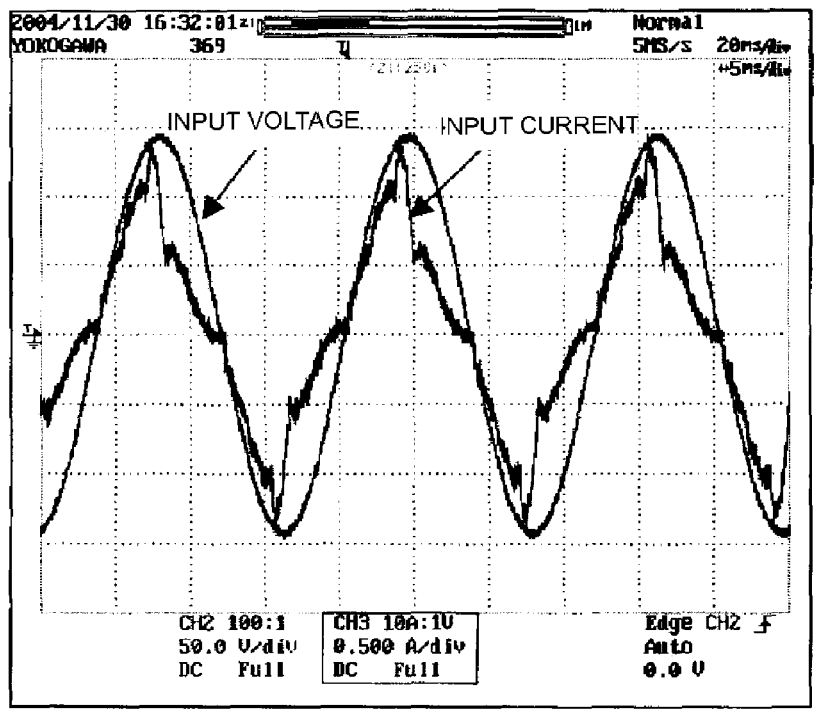

In FIGS. 6A and 6B, the relationship between an input voltage and an input current which has been measured in the power-supply unit 30 is shown by dividing them into the case where the main power-supply circuit 11 has a heavy load and the case where the main power-supply circuit 11 has a light load. The main power-supply circuit having a heavy load means that the load current is large and, in a related circuit, the ratio of the input current to the secondary power-supply circuit occupying in the whole input current is small and it is hard to generate harmonic current. On the contrary, the main power-supply circuit having a light load means that the load current is small and the ratio of the input current to the secondary power-supply circuit occupying in the whole current and it is relatively easy to generate harmonic current. Moreover, for comparison, in FIGS. 7A and 7B, also in the case where the other end of the smoothing capacitor C3 in the secondary power-supply circuit 31 is connected to the other output terminal of the full-wave rectifier D1, the relationship between an input voltage and an input current is shown by dividing them into the case where the main power-supply circuit has a heavy load and the case where the main power-supply circuit has a light load. The circuit is basically the same as a circuit in which the secondary power-supply circuit is directly connected to the alternating current power supply and the rectifying circuit is a full-wave rectification type circuit and the circuit is assumed to operate in the same way as the related circuit.

Figure 7A:
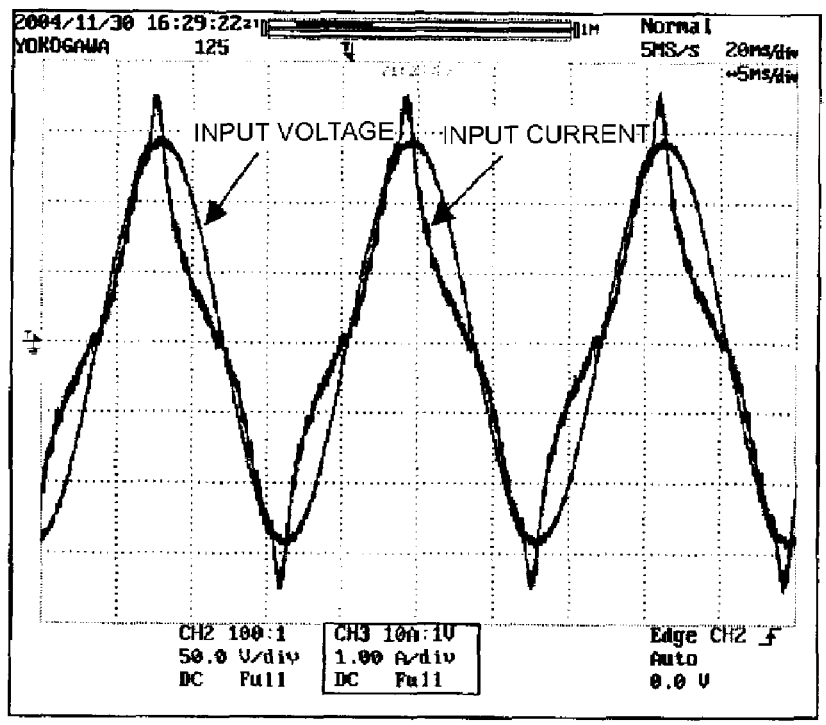
FIGS. 7A and 7B are characteristic diagrams showing the relationship between an input voltage and an input current in a related power-supply unit.

First, in the related circuit, when the main power-supply circuit has a heavy load, as shown in FIG. 7A, the input current of the switching power-supply circuit becomes a current waveform corresponding to a sine wave of the input voltage. The protruded portion at the top of the current waveform is caused by the input current to the secondary power-supply circuit. Moreover, the switching frequency of the switch element is about 1,000 times the frequency of the alternating current power supply, and, since a component of the frequency is smoothed to some extent by the noise rejection capacitor, small up-and-down vibrations in the current waveform are suppressed and the vibrations are barely seen in the illustrated waveform.

Figure 7B:
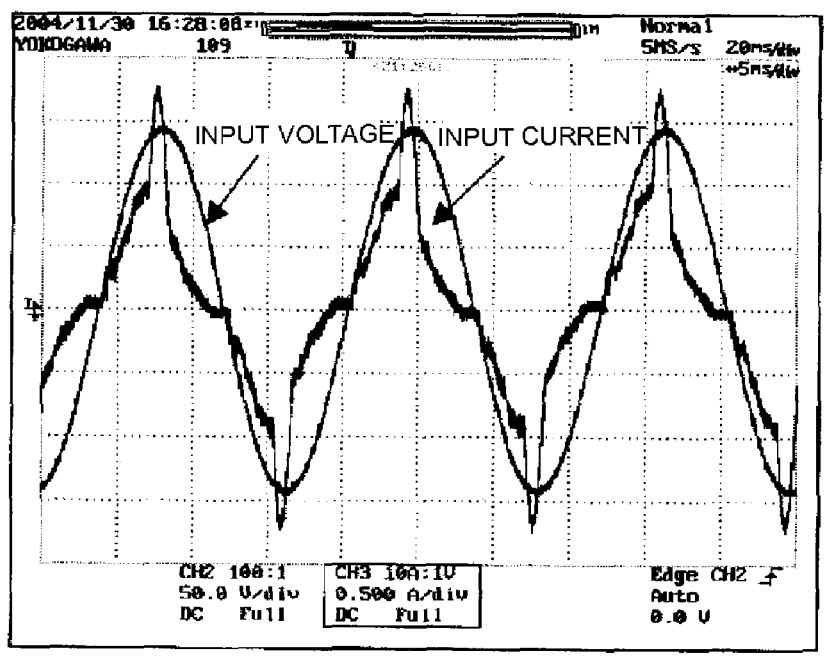

Then, when the load of the main power-supply circuit becomes light and the input current of the secondary power-supply circuit increases, as shown in FIG. 7B, the input current of the main power-supply circuit decreases and, as a result, the protruded portions at the top of the current waveform caused by the input current of the secondary power-supply circuit are emphasized. In this case, in comparison with the case where the main power-supply circuit has a heavy load, it is understood that harmonic current increases and the power factor is deteriorated.

On the other hand, in the case of the power-supply unit 30, when the main power-supply circuit has a heavy load, as shown in FIG. 6A, the input current of the switching power-supply circuit becomes a current waveform corresponding to the sine wave of the input voltage. Although the protruded portions at the top of the current waveform is caused by the input current of the secondary power-supply circuit, as is understood by comparison with FIG. 6A, the protruded portions at the top of the current waveform caused by the input current of the secondary power-supply circuit are small. That is, even if the main power-supply circuit has a heavy load, it is understood that harmonic current is suppressed and the power factor is improved.

Then, when the load of the main power-supply circuit becomes light and the input current of the secondary power-supply circuit relatively increases, as shown in FIG. 6B, the input current of the main power-supply circuit decreases and, as a result, the protruded portions at the top of the current waveform caused by the input current of the secondary power-supply circuit are increased. However, as is understood by comparison with FIG. 7B, the protrusions at the top of the current waveform are small. That is, even if the load of the main power-supply circuit is light, it is understood that harmonic current is suppressed and the power factor is improved.

In this way, in the power-supply unit 30, it is understood that, in comparison with the related circuit, the generation of harmonic current is suppressed and the power factor is improved.

Moreover, similar to the power-supply unit 30, in the power-supply unit 20 shown in FIG. 4, since the second rectifying circuit of the secondary power-supply circuit is a full-wave rectification type, although the illustration is omitted, the same results are obtained in the preferred embodiments.

On the other hand, in the power-supply unit 10 shown in FIG. 1, the second rectifying circuit of the second power-supply circuit is preferably a half-wave rectification type circuit. An input current of the secondary power-supply circuit is generated every half cycle of the alternating current power supply, which is different from the power-supply unit 30. Therefore, although this illustration is also omitted, the half cycle of the alternating current has the same waveform as that in the power-supply unit 30 and, since the secondary power-supply circuit practically does not exist during the remaining half cycle, the current waveform becomes a sine wave which is substantially proportional to the voltage waveform.

Preferred Embodiment 4

Figure 8:
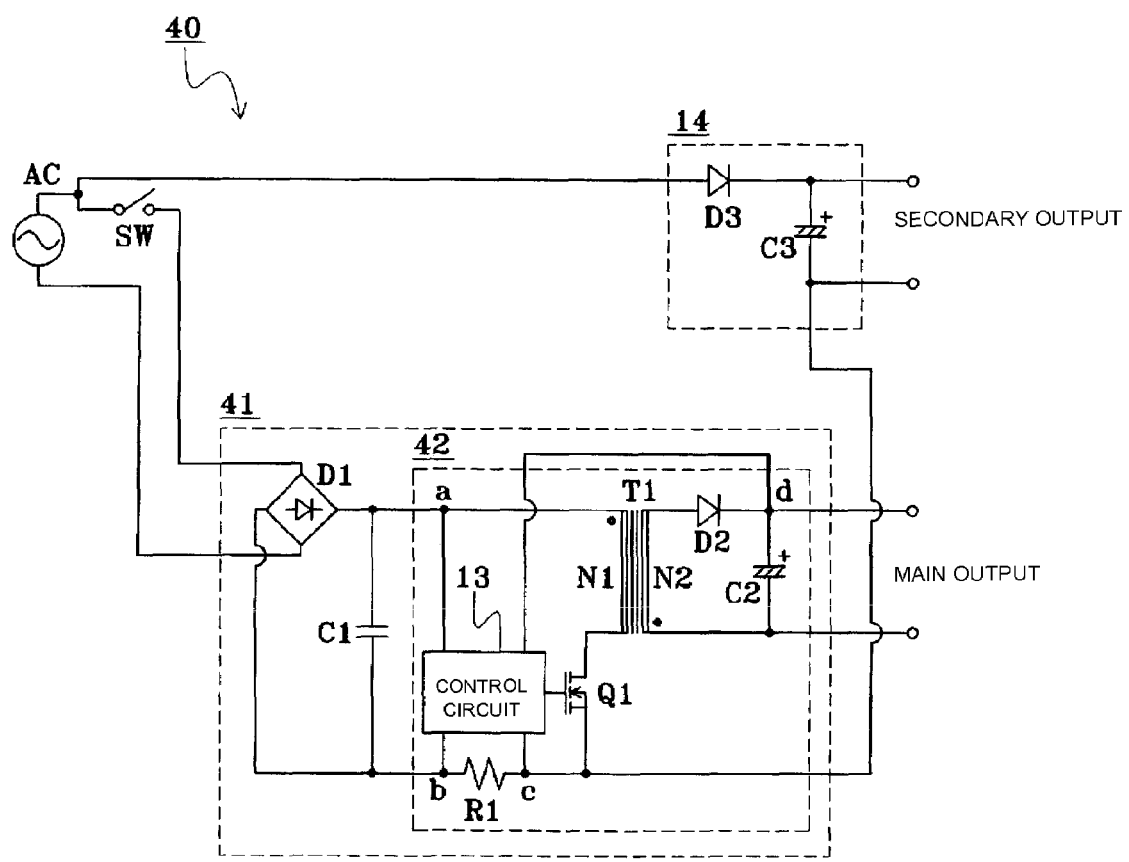
FIG. 8 is a circuit diagram of another preferred embodiment of a power-supply unit of the present invention.

FIG. 8 is a circuit diagram of another preferred embodiment of a power-supply unit of the present invention. In FIG. 8, the same reference numerals are given for the same or equivalent portions as in FIG. 1 and the descriptions thereof are omitted.

In a power-supply unit 40 shown in FIG. 8, a transformer T1 is provided instead of the inductive element L1 in the power-supply unit 10 and the primary winding N1 is disposed at the location at which the inductance element L1 was placed in the power-supply unit 10. Then, the diode D2 and the smoothing capacitor C2 in the power-supply unit 10 are connected to the secondary winding N2 of the transformer T1 to define a rectifying-smoothing circuit on the secondary winding side. Also in this case, an input current control circuit 42 includes the transformer T1, the switch element Q1, the resistor R1, the diode D2, the smoothing capacitor C2, and the control circuit 13. In the input current control circuit 42, energy is stored in the transformer T1 when a current flows in the primary winding N1 and, when no current flows in the primary winding, a current flows in the secondary winding and the stored energy is released, which constitutes a flyback converter. Then, when the full-wave rectifier D1 as a first rectifying circuit and the noise rejection capacitor C1 are added to that, the main power-supply circuit 41 is defined.

Moreover, the control circuit 13 is also connected to point d, which is the cathode of the diode D2, to detect the output voltage. However, since both are located on the primary winding and secondary winding sides of the transformer T1, electrical insulation is required to connect them.

Except for these features, the power-supply unit 40 is the same as the power-supply unit 10. Also in the structure of the secondary power-supply circuit 14, the other terminal of the capacitor C3 is connected to the other terminal of the alternating current power supply AC through the resistor R1 and the full-wave rectifier D1 of the main power-supply unit 41 such that the other terminal of the capacitor C3 is connected to the other terminal of the switch element Q1.

The power-supply unit 40 is the same as the power-supply unit 10, except for that the input current control circuit 42 is defined by a flyback converter. That is, if there is no secondary power-supply unit 14, the input current control circuit 42 functions as a harmonic current suppression circuit of the main power-supply circuit 41 and the input current from the alternating current power supply is substantially a sine wave to suppress the generation of harmonic current. Furthermore, when there is the secondary power-supply circuit 14 and a current flows to the secondary power-supply circuit 14, the input current to the main power-supply circuit 41 is controlled so that the summation of the current flowing to the main power-supply circuit 41 and the current flowing to the secondary power-supply circuit 14 from the alternating current power supply are substantially a sine wave. As a result, the generation of harmonic current is suppressed and simultaneously the power factor is improved.

Preferred Embodiment 5

Figure 9:
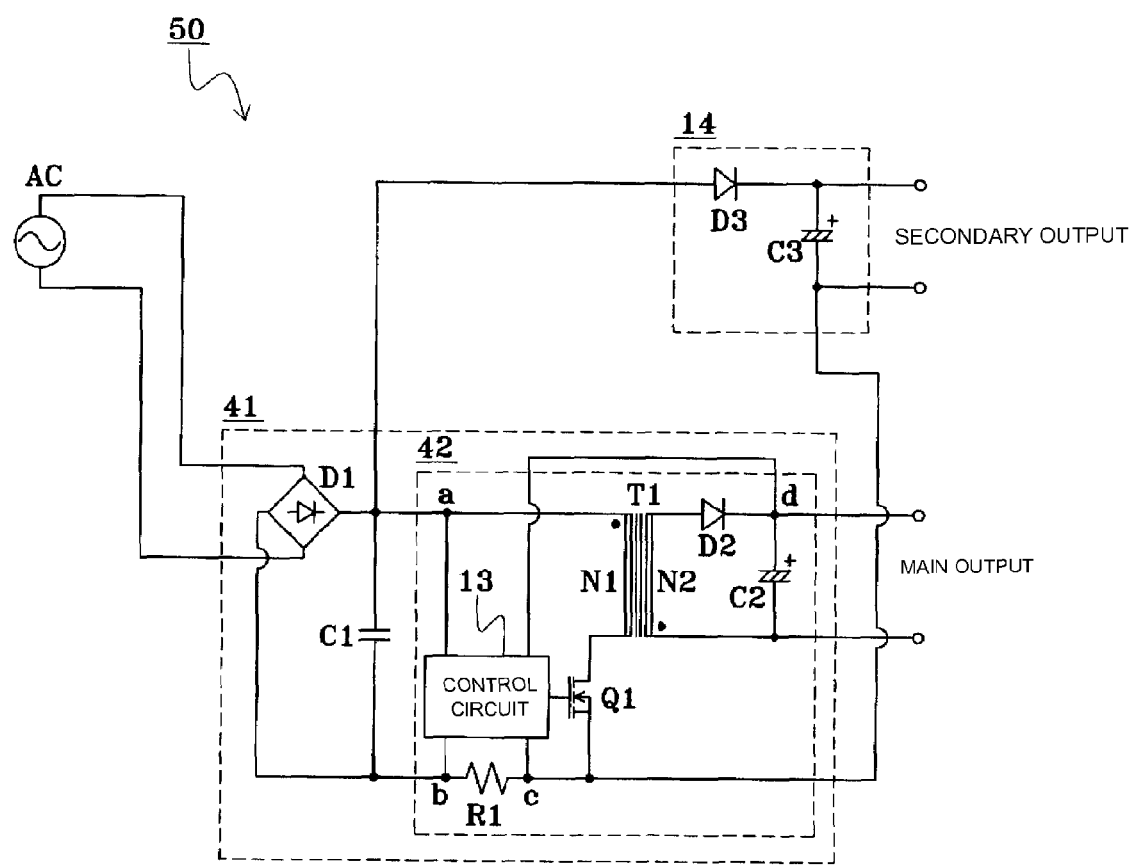
FIG. 9 is a circuit diagram of another preferred embodiment of a power-supply unit of the present invention.

FIG. 9 is a circuit diagram of another preferred embodiment of a power-supply unit of the present invention. In FIG. 9, the same reference numerals are given for the same or equivalent portions as in FIG. 1 and the descriptions thereof are omitted.

In a power-supply unit 50 shown in FIG. 9, the main power-supply circuit 41 is directly connected to the alternating current power supply AC, not through a switch. Moreover, the anode of the diode D3 in the secondary power-supply circuit 14 is connected to one output terminal of the full-wave rectifier D1. That is, the secondary power-supply circuit 14 is configured such that a voltage of the alternating current power supply which has been full-wave rectified by the full-wave rectifier D1 may be rectified by the second rectifying circuit including the diode D3 and smoothed by the capacitor C3.

Also in the power-supply unit 50, although a current flows to the secondary power-supply circuit 14 only when the amplitude of the input voltage is large in both of the two half cycles of one cycle of the frequency of the alternating current power supply, a current of the summation of the current flowing to the main power-supply circuit 41 from the alternating current power supply AC and the current flowing to the secondary power-supply circuit 14 becomes substantially proportional to the input voltage to the input current control circuit 42 in a similar manner as in the power-supply unit 40. Accordingly, a current that is substantially proportional to the voltage of the alternating current power supply AC flows to the power-supply unit 50, and, as a result, the generation of harmonic current is suppressed and the power factor is improved.

Preferred Embodiment 6

Figure 10:
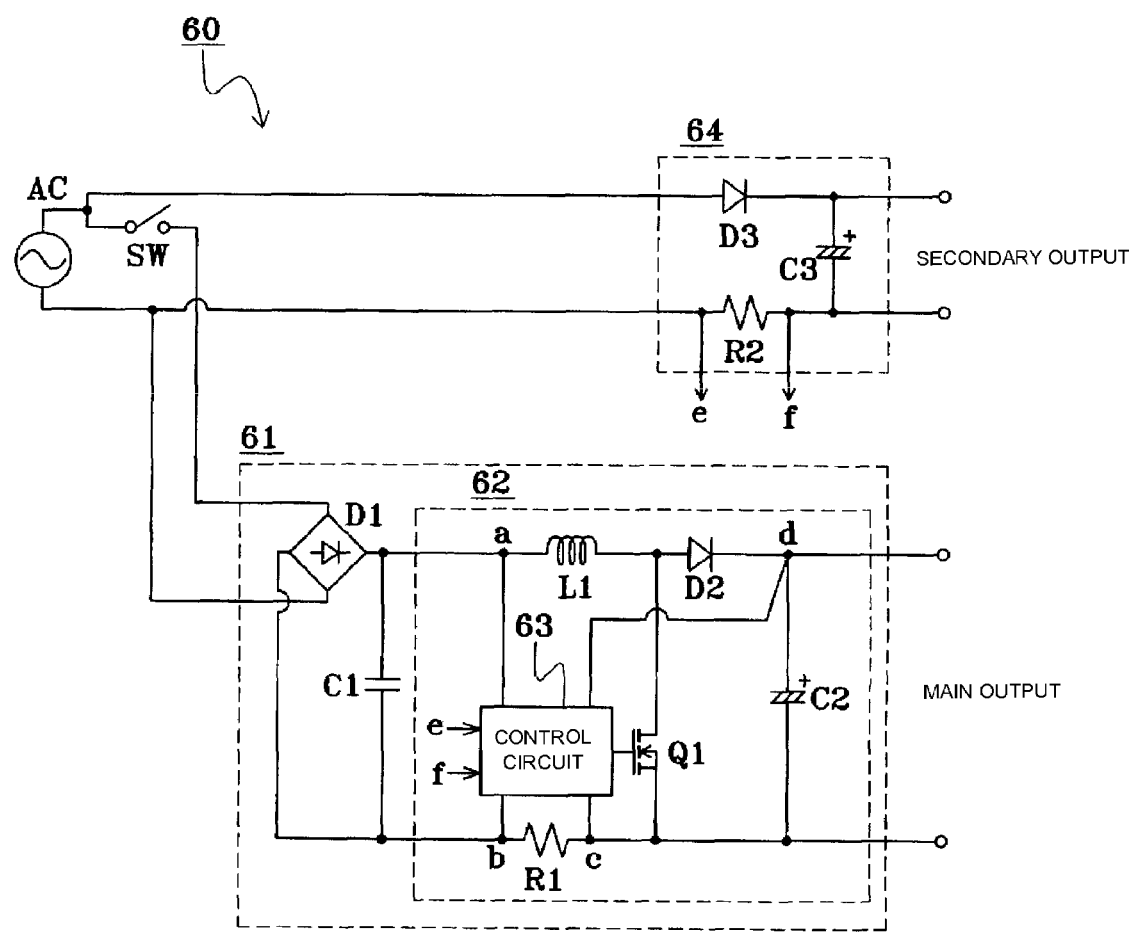
FIG. 10 is a circuit diagram of another preferred embodiment of a power-supply unit of the present invention.

FIG. 10 is a circuit diagram of another preferred embodiment of a power-supply unit of the present invention. In FIG.

10, the same reference numerals are given for the same or equivalent portions as in FIG. 1 and the descriptions thereof are omitted.

In a power-supply unit 60 shown in FIG. 10, a control circuit 63, instead of the control circuit 13, in the power-supply unit 10 is included in an input current control circuit 62 in a main power-supply circuit 61. In the control circuit 63, two input terminals are provided in addition to the structure of the control circuit 13. Except for this point, the main power-supply circuit 61 is the same as the main power-supply circuit 11 of the power-supply unit 10.

Furthermore, in the power-supply unit 60, the secondary power-supply circuit 64 is directly connected to the alternating current power supply AC. The secondary power-supply circuit 64 includes a resistor R2 in addition to a second rectifying circuit including the diode D3 and the smoothing capacitor C3. The resistor R2 is disposed between the other terminal of the capacitor C3 and the other terminal of the alternating current power supply AC. Therefore, the same current as a current flowing through the diode D3, that is, the input current to the secondary power-supply circuit 64 flows through the resistor R2, and a voltage corresponding to the flowing current is obtained between both terminals (point e and point f). Then, the voltage between both terminals is connected to the two input terminals which have been added in the control circuit 63.

As described above, the voltage between both terminals of the resistor R2 is input to the control circuit 63. Therefore, the control circuit 63 can detect the amount of an input current to the secondary power-supply circuit 64 from the alternating current power supply AC. Then, the control circuit 63 detects not only the current flowing through the resistor R21, but also the current flowing through the resistor R2, switching of the switch element Q1 is controlled on the basis of the summation of both. Therefore, as a result, the same controlling is performed as in the control circuit 13 in the power-supply unit 10.

In the present invention, the suppression of harmonic current and the improvement of power factor are achieved by detecting a current flowing to the secondary power-supply circuit somehow and by controlling a current of the main power-supply circuit on the basis of the added value of the current flowing to the secondary power-supply circuit and the current flowing to the main power-supply circuit.

Moreover, in each of the above-described preferred embodiments, although a resistor is preferably used as a circuit current detection element, another element, such as a current coil, for example, may be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A power-supply unit comprising:
a main power-supply circuit and a secondary power-supply circuit, both connected to an alternating current power supply;
an input current control circuit provided in the main power-supply circuit;
a circuit current detection element provided in the input current control circuit;
a first rectifying circuit connected between the alternating current power supply and the input current control circuit, the first rectifying circuit provided in the main power-supply circuit;
a second rectifying circuit connected to the alternating current power supply, the second rectifying circuit provided in the secondary power-supply circuit; and
a smoothing circuit connected to an output of the second rectifying circuit, the smoothing circuit provided in the secondary power-supply circuit; wherein
a current of a summation of an input current supplied to the main power-supply circuit and an input current supplied to the secondary power-supply circuit flows in the circuit current detection element; and
the input current control circuit controls the input current supplied to the main power-supply circuit such that harmonic current is suppressed in the current flowing in the circuit current detection element.

2. The power-supply unit as claimed in claim 1, further comprising:
a switch connected between the alternating current power supply and the first rectifying circuit.

3. The power-supply unit as claimed in claim 1, wherein the input current control circuit is a boost converter.

4. The power-supply unit as claimed in claim 3, wherein the boost converter includes an inductance element, one terminal of the inductance element is connected to one output terminal of the first rectifying circuit, a diode connected between the other terminal of the inductance element and an output terminal of the main power-supply circuit, a switch element connected between the other terminal of the inductance element and the other output terminal of the first rectifying circuit, and a smoothing capacitor connected between an output terminal of the main power-supply circuit and the other output terminal of the first rectifying circuit.

5. The power-supply unit as claimed in claim 1, wherein the input current control circuit is a flyback converter.

6. A power-supply unit as claimed in claim 5, wherein the flyback converter includes a transformer in which one terminal of a primary winding is connected to one output terminal of the first rectifying circuit, a switch element connected between the other terminal of the primary winding and the other terminal of the first rectifying circuit, a diode connected between one terminal of a secondary winding of the transformer and an output terminal of the main power-supply circuit, and a smoothing capacitor connected between an output terminal of the main power-supply circuit and the other terminal of the secondary winding.

7. A power-supply unit comprising:
a main power-supply circuit and a secondary power-supply circuit, both connected to an alternating current power supply;
an input current control circuit provided in the main power-supply circuit;
a circuit current detection element provided in the input current control circuit;
a first rectifying circuit connected between the alternating current power supply and the input current control circuit, the first rectifying circuit provided in the main power-supply circuit;
a second rectifying circuit connected to the alternating current power supply, the second rectifying circuit provided in the secondary power-supply circuit; and
a smoothing circuit connected to an output of the second rectifying circuit, the smoothing circuit provided in the secondary power-supply circuit; wherein
a current of a summation of an input current supplied to the main power-supply circuit and an input current supplied to the secondary power-supply circuit flows in the circuit current detection element; and the input current control circuit controls the input current supplied to the main power-supply circuit such that the current flowing in the circuit current detection element is substantially proportional to an input voltage supplied to the input current control circuit.

8. The power-supply unit as claimed in claim 7, further comprising: a switch connected between the alternating current power supply and the first rectifying circuit.

9. The power-supply unit as claimed in claim 7, wherein the input current control circuit is a boost converter.

10. The power-supply unit as claimed in claim 9, wherein the boost converter includes an inductance element, one terminal of the inductance element is connected to one output terminal of the first rectifying circuit, a diode connected between the other terminal of the inductance element and an output terminal of the main power-supply circuit, a switch element connected between the other terminal of the inductance element and the other output terminal of the first rectifying circuit, and a smoothing capacitor connected between an output terminal of the main power-supply circuit and the other output terminal of the first rectifying circuit.

11. The power-supply unit as claimed in claim 7, wherein the input current control circuit is a flyback converter.

12. A power-supply unit as claimed in claim 11, wherein the flyback converter includes a transformer in which one terminal of a primary winding is connected to one output terminal of the first rectifying circuit, a switch element connected between the other terminal of the primary winding and the other terminal of the first rectifying circuit, a diode connected between one terminal of a secondary winding of the transformer and an output terminal of the main power-supply circuit, and a smoothing capacitor connected between an output terminal of the main power-supply circuit and the other terminal of the secondary winding.

* * * * *